US010031519B2

(12) United States Patent
Yamada et al.

(10) Patent No.: US 10,031,519 B2
(45) Date of Patent: Jul. 24, 2018

(54) DRIVING SUPPORT DEVICE, DRIVING SUPPORT SYSTEM, AND DRIVING SUPPORT METHOD

(71) Applicant: Panasonic Intellectual Property Management Co., Ltd., Osaka (JP)

(72) Inventors: Kazushige Yamada, Kanagawa (JP); Osamu Yamaji, Hiroshima (JP); Azusa Gojyo, Kanagawa (JP); Satoshi Kajita, Kanagawa (JP); Toshiaki Mori, Kanagawa (JP); Makoto Okada, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/501,176

(22) PCT Filed: Jul. 19, 2016

(86) PCT No.: PCT/JP2016/003383
§ 371 (c)(1),
(2) Date: Feb. 2, 2017

(87) PCT Pub. No.: WO2017/022199
PCT Pub. Date: Feb. 9, 2017

(65) Prior Publication Data
US 2017/0364066 A1 Dec. 21, 2017

(30) Foreign Application Priority Data
Jul. 31, 2015 (JP) .................................. 2015-152851

(51) Int. Cl.
G05D 1/00 (2006.01)
G05D 1/02 (2006.01)

(52) U.S. Cl.
CPC ......... *G05D 1/0016* (2013.01); *G05D 1/0212* (2013.01)

(58) Field of Classification Search
USPC ........................................................ 701/23
See application file for complete search history.

(56) References Cited

U.S. PATENT DOCUMENTS 9,581,460 B1 * 2/2017 McNew ............ G01C 21/3667
2006/0224316 A1 10/2006 Ishida et al.
(Continued)

FOREIGN PATENT DOCUMENTS

JP 2005-041433 2/2005
JP 2006-284218 10/2006
(Continued)

OTHER PUBLICATIONS

International Search Report of PCT application No. PCT/JP2016/003383 dated Oct. 25, 2016.

*Primary Examiner* — Tyler Paige
(74) *Attorney, Agent, or Firm* — Seed IP Law Group LLP

(57) ABSTRACT

In a driving support device, an image output unit outputs image information including a vehicle object representing a vehicle and a sign object representing a sign, to a display unit. An operation signal input unit receives an operation signal of a user for moving, in the image displayed on the display unit, the vehicle object to the position of the sign object or for moving the sign object to the position of the vehicle object. A command output unit outputs a command corresponding to the display content in the sign object when the operation signal is received, to an automatic driving control unit that controls automatic driving.

12 Claims, 13 Drawing Sheets

(56) References Cited

U.S. PATENT DOCUMENTS

| | | | |
|---|---|---|---|
| 2010/0023257 A1 | 1/2010 | Machino | |
| 2010/0030462 A1 | 2/2010 | Iwaji et al. | |
| 2012/0022716 A1 | 1/2012 | Kitahama et al. | |
| 2012/0173069 A1* | 7/2012 | Tsimhoni | G01C 21/365 701/25 |
| 2012/0310465 A1* | 12/2012 | Boatright | B60Q 1/346 701/25 |
| 2013/0289858 A1* | 10/2013 | Mangiat | G05D 1/0027 701/117 |
| 2014/0088855 A1* | 3/2014 | Ferguson | G08G 1/166 701/117 |
| 2014/0278029 A1* | 9/2014 | Tonguz | G08G 1/087 701/117 |
| 2014/0365228 A1* | 12/2014 | Ng-Thow-Hing | G02B 27/01 704/275 |
| 2015/0244826 A1* | 8/2015 | Stenneth | H04Q 9/00 709/213 |
| 2017/0197637 A1* | 7/2017 | Yamada | B60W 50/10 |
| 2017/0203763 A1* | 7/2017 | Yamada | B60W 30/18163 |
| 2017/0225702 A1* | 8/2017 | Yamada | B62D 1/22 |

FOREIGN PATENT DOCUMENTS

| | | |
|---|---|---|
| JP | 2008-032629 | 2/2008 |
| JP | 2008/072412 A1 | 3/2010 |
| JP | 2010-198578 | 9/2010 |
| JP | 2014-074627 | 4/2014 |
| JP | 2015-011458 | 1/2015 |
| WO | 2008/099483 | 8/2008 |
| WO | 2015/141308 | 9/2015 |

* cited by examiner

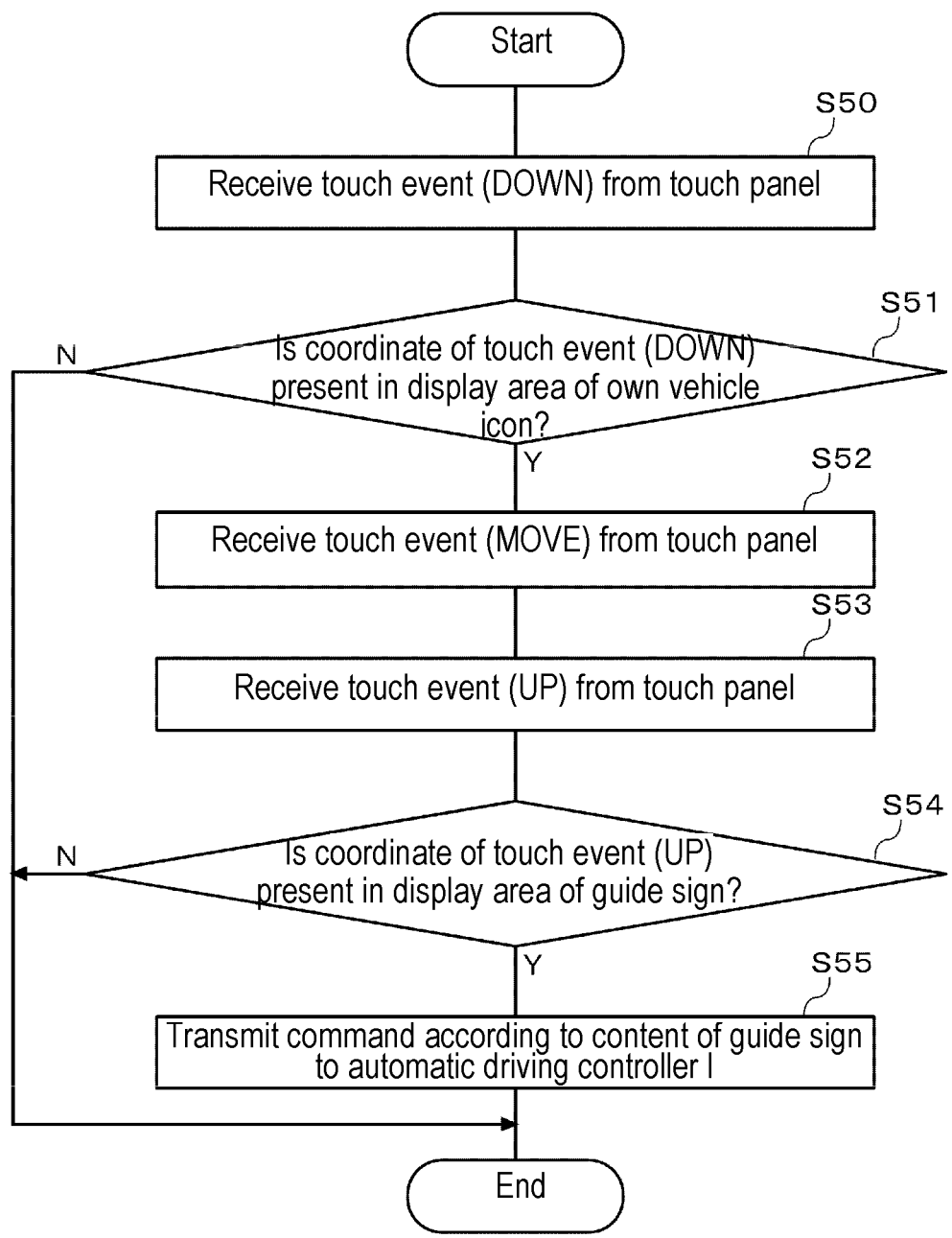

DRIVING SUPPORT DEVICE, DRIVING SUPPORT SYSTEM, AND DRIVING SUPPORT METHOD

CROSS-REFERENCE TO RELATED APPLICATIONS

This application is a U.S. national stage application of the PCT International Application No. PCT/JP2016/003383 filed on Jul. 19, 2016, which claims the benefit of foreign priority of Japanese patent application No, 2015-152851 filed on Jul. 31, 2015, the contents all of which are incorporated herein by reference.

TECHNICAL FIELD

The present invention relates to a technique that supports a driving operation instruction of a driver to a vehicle during automatic driving.

BACKGROUND ART

In recent years, developments in automatic driving have progressed. For automatic driving, autonomy levels defined in 2013 by the National Highway Traffic Safety Administration (NHTSA) are classified as no autonomy (level 0), specific-function autonomy (level 1), complex-function autonomy (level 2), semi-automatic driving (level 3), and full-automatic driving (level 4). Level 1 is a driving support system that automatically performs one of acceleration, deceleration, and steering, and level 2 is a driving support system that automatically performs two or more of acceleration, deceleration, and steering in coordination. In all cases, a driver is required to be involved in a driving operation. Autonomy level 4 is a fully-automatic driving system that automatically performs all of acceleration, deceleration, and steering, and thus a driver is not involved in a driving operation. Autonomy level 3 is a semi-fully-automatic driving system that automatically performs all of acceleration, deceleration, and steering, but if necessary, a driving operation is performed by a driver.

As a form of automatic driving, a form in which a driver does not operate an existing driving operation unit such as a steering, an accelerator pedal, or the like but instructs a specific driving operation such as traffic lane change, passing, following traveling, or the like to a vehicle by issuing a command to a vehicle is considered. In this form, a user interface in which there are fewer erroneous operations is required. A technique that extracts a guide sign from the original image and selectively displays the guide sign based on a traveling direction or the like is known (for example, refer to PTL 1).

CITATION LIST

Patent Literature

PTL 1: Japanese Patent Unexamined Publication No. 2014-074627

SUMMARY OF THE INVENTION

In order to solve the above-described problems, a driving support device according to an aspect of the present disclosure includes an image output unit that outputs image information including a vehicle object representing a vehicle and a sign object representing sign information, to a display unit. The driving support device further includes an operation signal input unit that receives an operation signal of a user for moving, in the image displayed on the display unit, the vehicle object to the position of the sign object or for moving the sign object to the position of the vehicle object. The driving support device further includes a command output unit that outputs an automatic driving control command corresponding to the display content in the sign object when the operation signal is received, to an automatic driving control unit that controls automatic driving.

As another aspect of the present invention, an aspect in which an expression of the present invention is converted into a device, a system, a method, a program, a recording medium in which a program is recorded, and an automatic drive vehicle equipped therewith by arbitrarily combining the above components is also effective.

According to the present disclosure, a driver can intuitively and conveniently instruct a specific driving operation to a vehicle.

BRIEF DESCRIPTION OF DRAWINGS

FIG. 6 is a flowchart illustrating a processing example of issuing a command corresponding to the content of the road guide sign by a gesture operation.

DESCRIPTION OF EMBODIMENTS

Prior to the description of an exemplary embodiment of the present invention, problems in the related art are briefly described.

In a case where automatic driving is applied to a vehicle, it takes some time for a driver to confirm a sign and then instruct a course using separate means (a steering, an accelerator, or the like) located at another location. In a design in which each switch is designed for a specific driving operation such as traffic lane change, passing, following traveling, or the like, in a case where a driver operates the switch without looking at a his/her hand while checking a peripheral situation of the vehicle, there is a possibility of an erroneous operation. Further, the correspondence between a switch operation and automatic traveling control is not intuitive, and selecting an instruction among many switches or selecting a changed function with reduced switches according to a situation is a complex task. There is a problem in that a wide range of users including a person who has not been driving up to now, a person who wants to continue to drive even though the driving capability of the person has been reduced, or the like, cannot use an automatic drive vehicle without training.

The present disclosure has been made in consideration of such a situation, and an object thereof is to provide a technique that allows a driver to intuitively and conveniently instruct a specific driving operation to a vehicle.

Figure 1:
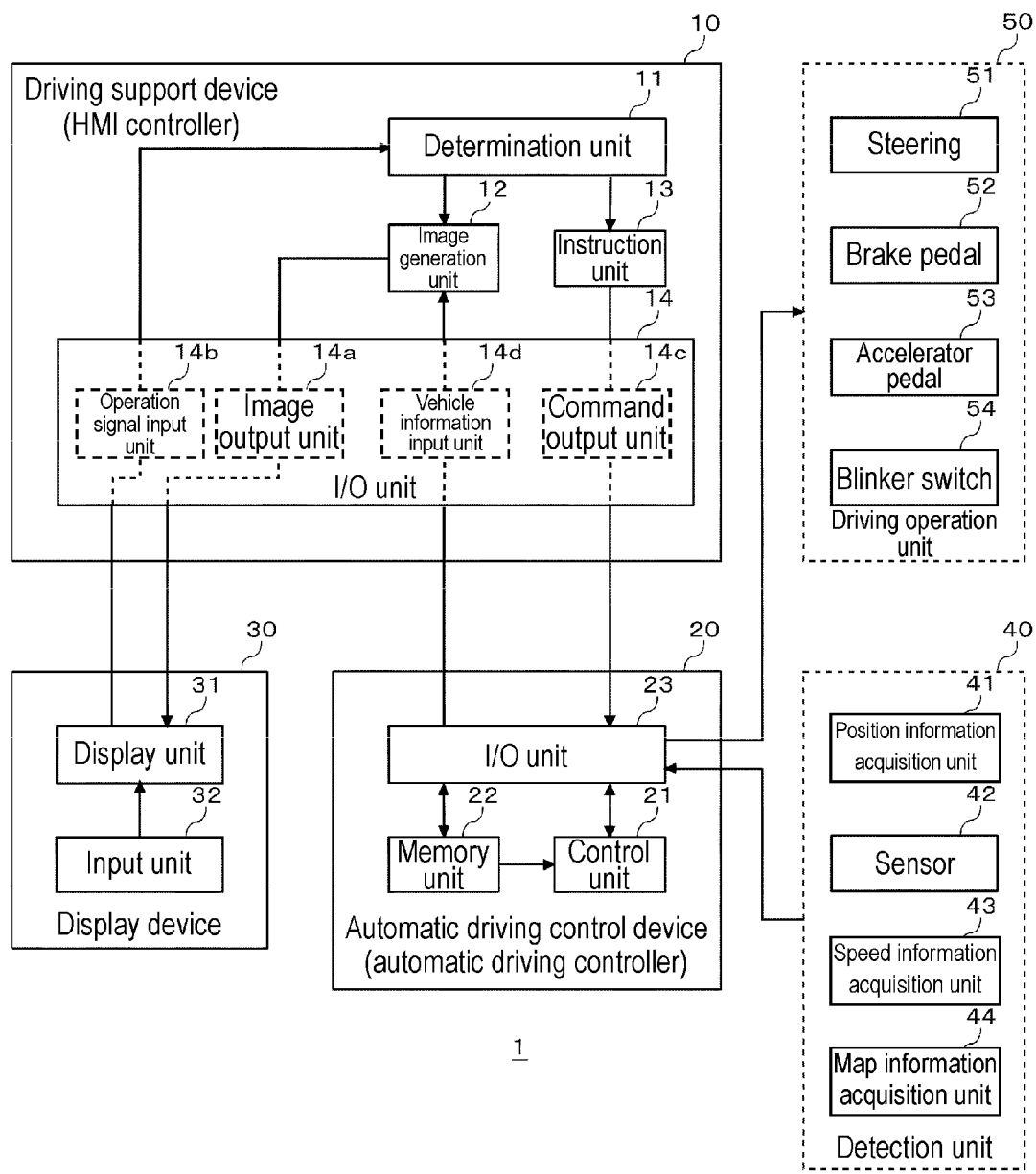
FIG. 1 is a block diagram illustrating a configuration of a vehicle according to an embodiment of the present invention.

Hereinafter, embodiments of the present invention will be described with reference to the drawings. FIG. 1 is a block diagram illustrating a configuration of vehicle 1 according to an embodiment of the present invention, and illustrates a configuration related to automatic driving. Vehicle 1 (an own vehicle) with an automatic driving mode includes driving support device (human-machine interface (HMI) controller) 10, automatic driving control device (automatic driving controller) 20, display device 30, detection unit 40, and driving operation unit 50.

Display device 30 includes display unit 31 and input unit 32. Display device 30 may be a head unit such as a car navigation system, a display audio, or the like, a portable terminal device such as a smart phone, a tablet, or the like, or a dedicated console terminal device.

Display unit 31 is a liquid crystal display, an organic electro-luminescence (EL) display, or a heads-up display (HUD). Input unit 32 is a user interface that receives an input of a user. Display unit 31 and input unit 32 may be an integrated touch panel display. Such as a proximity touch panel that can detect proximity of a hand on a touch panel or a touch pad or a position of a finger due to a hover operation, one that receives a gesture input at a position apart from a predetermined distance from the display unit may be used. Input unit 32 may have an input device such as a mouse, a stylus pen, a trackball, or the like for assisting the gesture input. A pen that emits visible light or infrared light may also be used.

Display unit 31 and input unit 32 may be physically separated from each other, instead of being an integrated touch panel display. For example, input unit 32 includes a sensor such as a camera or the like, and may be a non-contact type input device that allows a gesture operation input in the air. For example, an operation method that starts to drag with a gesture by pointing a target with a finger and making a thumb finger and an index finger close and shut together, and ends to drag with a gesture by making a thumb finger and an index finger separated from each other, is considered.

Driving support device 10 and display device 30 may be connected to each other by wire communication such as a dedicated line, a controller area network (CAN), or the like, or may be connected to each other by wire communication or wireless communication such as USB, Ethernet (registered trademark), Wi-Fi (registered trademark), Bluetooth (registered trademark), or the like.

Detection unit 40 includes position information acquisition unit 41, sensor 42, speed information acquisition unit 43, and map information acquisition unit 44. Position information acquisition unit 41 acquires a current position of vehicle 1 from a global positioning system (GPS) receiver. Sensor 42 is a general term for various sensors for detecting a situation outside the vehicle and a state of vehicle 1. As a sensor for detecting a situation outside the vehicle, for example, a camera, a millimeter wave radar, a light detection and ranging (laser imaging detection and ranging, LIDAR), a temperature sensor, a pressure sensor, a humidity sensor, an illumination sensor, or the like is mounted. As a situation outside the vehicle, a road situation in which the own vehicle travels or an environmental situation including weather, and an own vehicle peripheral situation such as a traveling position or a traveling state of an another vehicle traveling at the periphery of the own vehicle are considered. Any information outside the vehicle that can be detected by the sensor may be considered. As a sensor for detecting a state of vehicle 1, for example, an acceleration sensor, a gyro sensor, a geomagnetic sensor, an inclination sensor, or the like is mounted. Speed information acquisition unit 43 acquires the current speed of vehicle 1 from a vehicle speed sensor. Map information acquiring unit 44 acquires map information around the current position of vehicle 1 from a map database. Map database may be recorded on a recording medium in vehicle 1, or may be downloaded from a map server via a network in use.

Detection unit 40 and automatic driving control device 20 are connected to each other by wire communication such as a dedicated line, a USB, an Ethernet (registered trademark), a controller area network (CAN), or the like. A configuration in which data acquired and detected by detection unit 40 is directly output from detection unit 40 to driving support device 10 may be employed.

Driving operation unit 50 includes steering 51, brake pedal 52, accelerator pedal 53, and blinker switch 54. In an automatic driving mode according to the present embodiment, acceleration, deceleration, steering, and blinker blink are a target of automatic control by automatic driving control device 20. In FIG. 1, an operation unit when these controls are performed manually is drawn. Information indicating that driving operation unit 50 is slightly moved by a driver in a manual way may output to driving support device 10.

Steering 51 is an operation unit for steering the vehicle. When steering 51 is rotated by a driver, the traveling direction of the vehicle is controlled through a steering actuator. The steering actuator can be electronically controlled by a steering electronic control unit (ECU).

Brake pedal 52 is an operation unit for decelerating vehicle 1. When brake pedal 52 is depressed by a driver, the vehicle is decelerated via a brake actuator. The brake actuator can be electronically controlled by a brake ECU.

Accelerator pedal 53 is an operation unit for accelerating vehicle 1. When accelerator pedal 53 is depressed by a driver, an engine rotation speed and/or a motor rotation speed is controlled via an accelerator actuator. In a pure gas car, the engine rotation speed is controlled. In a pure electric vehicle, the motor rotation speed is controlled. In a hybrid car, both of the engine rotation speed and the motor rotation speed are controlled. The accelerator actuator can be electronically controlled by at least one of an engine ECU and a motor ECU.

Blinker switch 54 is an operation unit for blinking a blinker so as to notify a course of the vehicle to the outside.

When blinker switch 54 is turned on/off by a driver, the blinker is turned on/off via a blinker controller. The blinker controller includes a drive circuit such as a relay controlling power supply to a blinker lamp, or the like.

Each of the steering ECU, the brake ECU, the engine ECU, the motor ECU, and the blinker controller and automatic driving control device 20 are connected to each other by wired communication such as a CAN, a dedicated line, or the like. Each of the steering ECU, the brake ECU, the engine ECU, the motor ECU, and the blinker controller respectively transmits a state signal indicating the state of each of a steering, a brake, an engine, a motor, and a blinker lamp to automatic driving control device 20.

In the automatic driving mode, each of the steering ECU, the brake ECU, the engine ECU, and the motor ECU drives the corresponding actuator according to a control signal supplied from automatic driving control device 20. In a manual driving mode, a configuration in which an instruction is directly transferred from each of steering 51, brake pedal 52, and accelerator pedal 53 to the corresponding actuator in a mechanical way may be employed, or a configuration in which electronic control intervenes via the corresponding ECU may be employed. The blinker controller turns on/off the blinker lamp according to the control signal supplied from automatic driving control device 20 or an instruction signal from blinker switch 54.

Automatic driving control device 20 is an automatic driving controller that has an automatic driving control function, and includes control unit 21, memory unit 22, and input-output unit 23. The configuration of control unit 21 may be realized by cooperation between hardware resources and software resources or only hardware resources. As the hardware resources, a processor, a read only memory (ROM), a random access memory (RAM), and other large scale integrated (LSI) circuits can be used, and as software resources, an operating system, an application, and a program such as a firmware or the like can be used. Memory unit 22 includes a non-volatile recording medium such as a flash memory or the like. Input-output unit 23 performs various communication control according to various communication formats.

Control unit 21 calculates a control value for controlling an automatic control target such as a traveling direction of vehicle 1 by applying various parameter values collected from detection unit 40 and various ECUs to an automatic driving algorithm. Control unit 21 transfers the calculated control value to the ECU or controller of each control target. In the present embodiment, the control value is transferred to the steering ECU, the brake ECU, the engine ECU, and the blinker controller. In a case of an electric vehicle or a hybrid car, the control value is transferred to the motor ECU instead of the engine ECU or in addition to the engine ECU.

Driving support device 10 is a human machine interface (HMI) controller for performing an interface function between vehicle 1 and a driver, and includes determination unit 11, image generation unit 12, instruction unit 13, and input-output unit 14. Determination unit 11, image generation unit 12, and instruction unit 13 can be realized by cooperation between hardware resources and software resources, or only hardware resources. As the hardware resources, a processor, a ROM, a RAM, and other LSI circuits can be used, and as software resources, an operating system, an application, and a program such as a firmware or the like can be used. Input-output unit 14 performs various communication control according to various communication formats. Input-output unit 14 includes image output unit 14a, operation signal input unit 14b, command output unit 14c, and vehicle information input unit 14d. Image output unit 14a outputs an image generated by image generation unit 12 to display unit 31. Operation signal input unit 14b receives an operation signal that is input from input unit 32 by an operation of a driver, a passenger, or a user outside the vehicle, and outputs the operation signal to determination unit 11. Command output unit 14c outputs the command instructed by instruction unit 13 to automatic driving controller 20. Vehicle information input unit 14d receives detection data acquired by detection unit 40 or vehicle information generated by automatic driving controller 20, and outputs the detection data or the vehicle information to image generation unit 12.

Automatic driving controller 20 and HMI controller 10 are directly connected to each other by a signal line. A configuration in which automatic driving controller 20 and HMI controller 10 are connected to each other via a CAN may be employed. A configuration in which automatic driving controller 20 and HMI controller 10 are integrated into one controller may be also employed.

Figure 2:
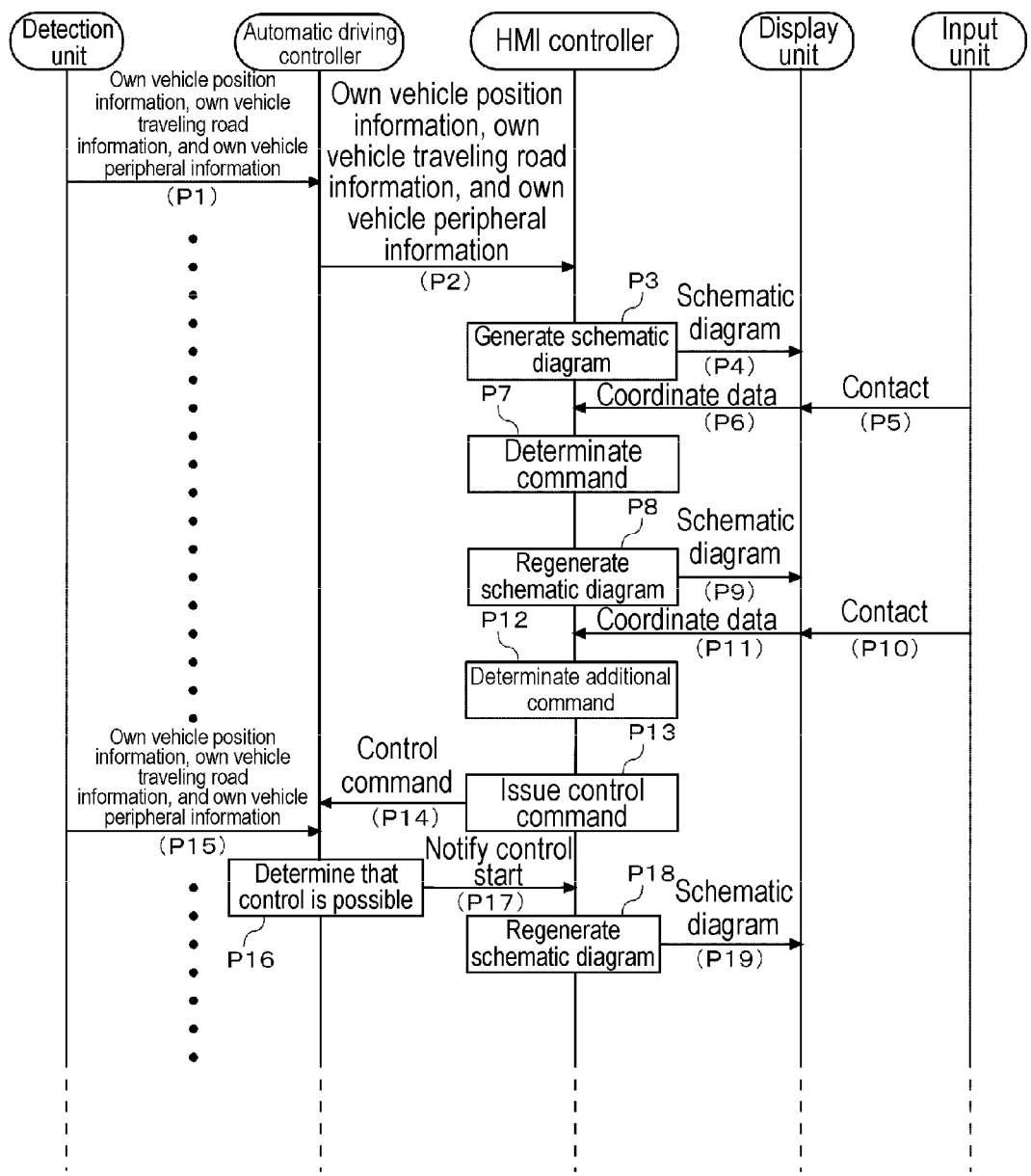
FIG. 2 is a diagram illustrating an example of a basic sequence of detection unit, automatic driving controller, HMI controller, display unit, and input unit in FIG. 1.

FIG. 2 is a diagram illustrating an example of a basic sequence of detection unit 40, automatic driving controller 20, HMI controller 10, display unit 31, and input unit 32 in FIG. 1. Detection unit 40 detects own vehicle position information, own vehicle traveling road information, and own vehicle peripheral information, and outputs the detected information to automatic driving controller 20 (P1). Automatic driving controller 20 outputs the own vehicle position information acquired from detection unit 40, the own vehicle traveling road information, and the own vehicle peripheral information to HMI controller 10 (P2). HMI controller 10 generates a schematic diagram including the own vehicle and the own vehicle peripheral situation based on the information acquired from automatic driving controller 20 (P3). HMI controller 10 outputs the generated schematic diagram to display device 30, and the schematic diagram is displayed on display unit 31 (P4).

A user who views the schematic diagram displayed on display unit 31 comes into contact with input unit 32 (P5). Display unit 31 outputs coordinate data at a position at which the contact is detected to HMI controller 10 (P6). HMI controller 10 determines a type of the command based on the coordinate data acquired from display device 30 (P7). HMI controller 10 receives an additional input until a certain period of time has elapsed (P8 to P12). After determination of the command, HMI controller 10 regenerates a schematic diagram indicating that the command is being instructed (P8). HMI controller 10 outputs the regenerated schematic diagram to display device 30, and the regenerated schematic diagram is displayed on display unit 31 (P9). In a case where the command corresponding to the gesture operation by the touch of a user does not exist, HMI controller 10 generates a schematic diagram including an error message, and outputs the schematic diagram to display device 30, and the schematic diagram is displayed on display unit 31.

When a user who views the schematic diagram indicating that the command is being instructed comes into contact with input unit 32 (P10), display unit 31 outputs the coordinate data at a position at which the contact is detected to HMI controller 10 (P11). HMI controller 10 performs additional command processing based on the coordinate data acquired from display device 30 (P12). In a case where there is no input of a new command in the additional command processing (P12), HMI controller 10 issues a command determined in P7 to automatic driving controller 20 (P13 and P14). In a case where a new command is input in the additional command processing (P12), HMI controller 10 issues a new command to automatic driving controller 20. In a case where the new command that is input is a cancel command, HMI controller 10 cancels the issue of a command. Processing of overwriting and canceling of the original command due to a new command may be performed by automatic driving controller 20. In this case, after the command determination processing in P7 and P12, HMI controller 10 transmits the command to automatic driving controller 20, and performs processing of overwriting and canceling according to an internal state of automatic driving controller 20.

Detection unit 40 periodically detects the own vehicle position information, the own vehicle traveling road information, and the own vehicle peripheral information, and outputs the information to automatic driving controller 20 (P15). Automatic driving controller 20 determines whether or not control instructed by the command issued from HMI controller 10 is executable (P16), based on the information. In a case where it is determined that the control is executable, automatic driving controller 20 outputs a control start notification to HMI controller 10 (P17). When the control start notification is received, HMI controller 10 regenerates a schematic diagram including a message indicating that the control is being performed (P18). HMI controller 10 outputs the regenerated schematic diagram to display device 30, and the regenerated schematic diagram is displayed on the display unit 31 (P19). Although not illustrated, automatic driving controller 20 calculates a control value for controlling driving operation unit 50 that performs the issued command by applying various parameter values collected from detection unit 40 or various ECUs to an automatic driving algorithm, and transfers the control value to the ECU or controller of each control target. The control value is a specific value for automatically controlling control target such as a traveling direction of vehicle 1 or the like. Driving operation unit 50 operates based on the specific control value. When a predetermined control value or the detection data acquired by detection unit 40 is a predetermined value (in a predetermined range), and when automatic driving controller 20 determines that a condition of the issued command is satisfied, driving operation unit 50 determines that performing of the command is completed.

When a control completion notification is received from automatic driving controller 20, HMI controller 10 generates a schematic diagram including a message indicating that control is completed, and outputs the generated schematic diagram to display device 30. During a period for which an operation from a user is not received, HMI controller 10 generates a schematic diagram including a message indicating that an operation is not received, and outputs the generated schematic diagram to display device 30.

Figure 3:
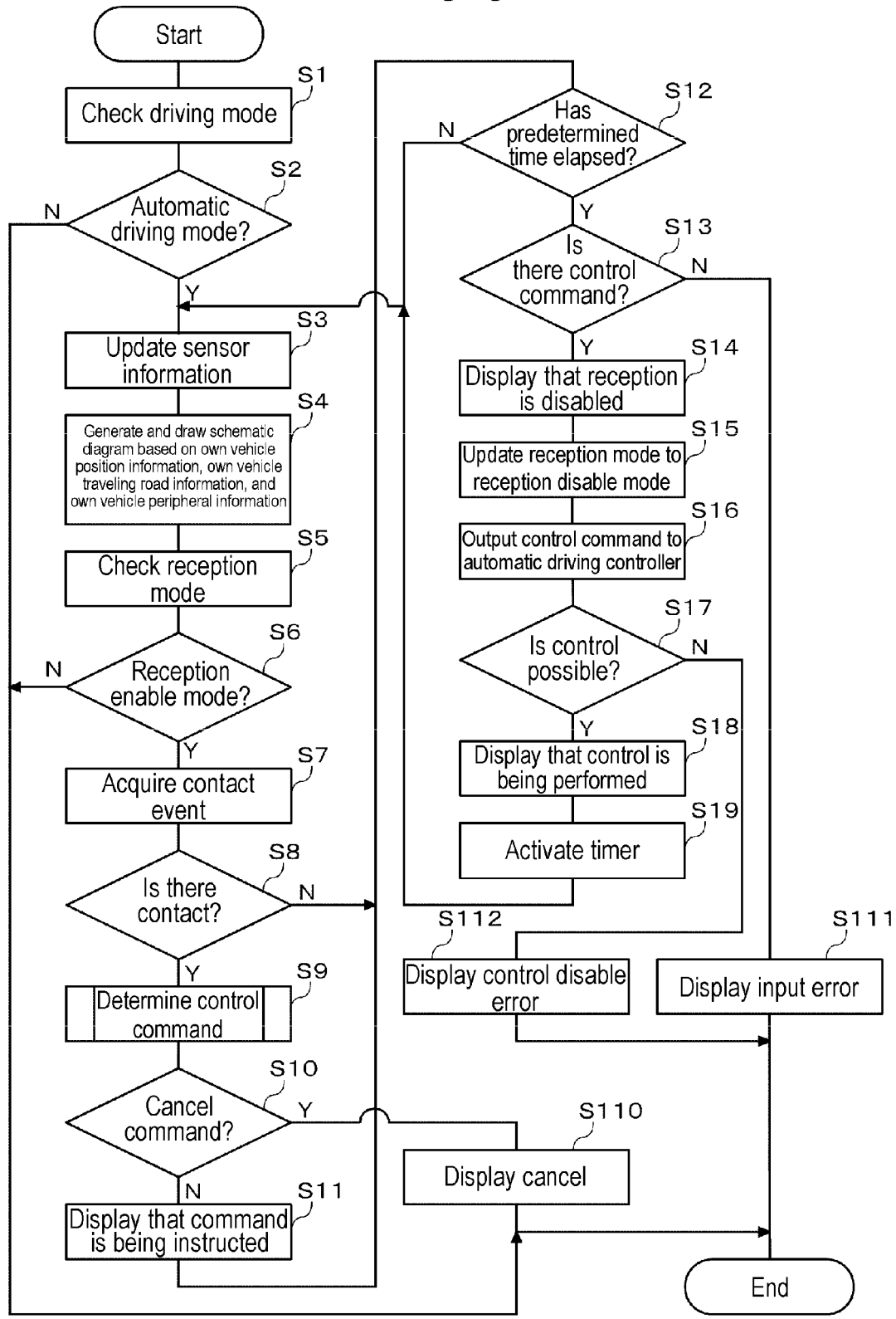
FIG. 3 is a diagram illustrating an example of a basic flowchart for explaining processing of HMI controller in FIG. 1.

FIG. 3 is a diagram illustrating an example of a basic flowchart for explaining processing of HMI controller 10 in FIG. 1. Determination unit 11 of HMI controller 10 checks whether or not a driving mode is an automatic driving mode or a manual driving mode (S1). In the manual driving mode (N in S2), the process ends. In a case of the automatic driving mode (Y in S2), processing is performed as follows.

Sensor information that is input from detection unit 40 to automatic driving controller 20 is updated at any time (S3). Image generation unit 12 of HMI controller 10 generates a schematic diagram including the own vehicle and the own vehicle peripheral situation based on the own vehicle position information, the own vehicle traveling road information, and the own vehicle peripheral information that are input from automatic driving controller 20, and draws the generated schematic diagram on display unit 31 (S4). Determination unit 11 checks whether or not a reception mode is a reception enable mode in which an operation from a user can be received or a reception disable mode in which an operation from a user cannot be received (S5). In a case where the reception mode is the reception disable mode (N in S6), the process ends. In a case where the reception mode is the reception enable mode (Y in S6), determination unit 11 determines whether or not there is a contact to input unit 32 by a user (S7). In a case where there is no contact to input unit 32 by a user (N in S8), predetermined-time elapse determination processing (S12) to be described later is performed. In a case where there is a contact to input unit 32 by a user (Y in S8), determination unit 11 determines a control command according to a gesture operation input by a user (S9). The details of the control command determination processing will be described later.

In a case where the control command determined in step S9 is not a cancel command (N in S10), image generation unit 12 displays that the command is being instructed on display unit 31 (S11). When a predetermined time has elapsed after the control command is determined (Y in S12), in a case where there is a control command determined in step S9 (Y in S13), operation reception disable is displayed on display unit 31 (S14), determination unit 11 updates the reception mode from the reception enable mode to the reception disable mode (S15), and instruction unit 13 outputs the determined control command to automatic driving controller 20 (S16). Until a predetermined time has elapsed (N in S12), the process transitions to step S3.

In step S10, in a case where the determined control command is a cancel command (Y in S10), cancel is displayed (S110), and the process ends. In step S13, in a case where there is no control command determined in step S9 (N in S13), an input error is displayed (S111), and the process ends. Automatic driving controller 20 periodically detects the own vehicle position information, the own vehicle traveling road information, and the own vehicle peripheral information from detection unit 40. Since the own vehicle peripheral situation constantly changes, after the control command is output to automatic driving controller 20, there is a case where it is determined that the control command is not executable. For example, after a following instruction, there is a case where other cars interrupt between the own vehicle and an another vehicle. In a case where it is determined that the control command is executable by automatic driving controller 20 (Y in S17), image generation unit 12 displays that the control is being performed on display unit 31 (S18), and starts counting by activating a timer (S19). In a case where it is determined that the control is not executable by automatic driving controller 20 (N in S17), image generation unit 12 displays a control disable error on display unit 31 (S112).

Figure 4:
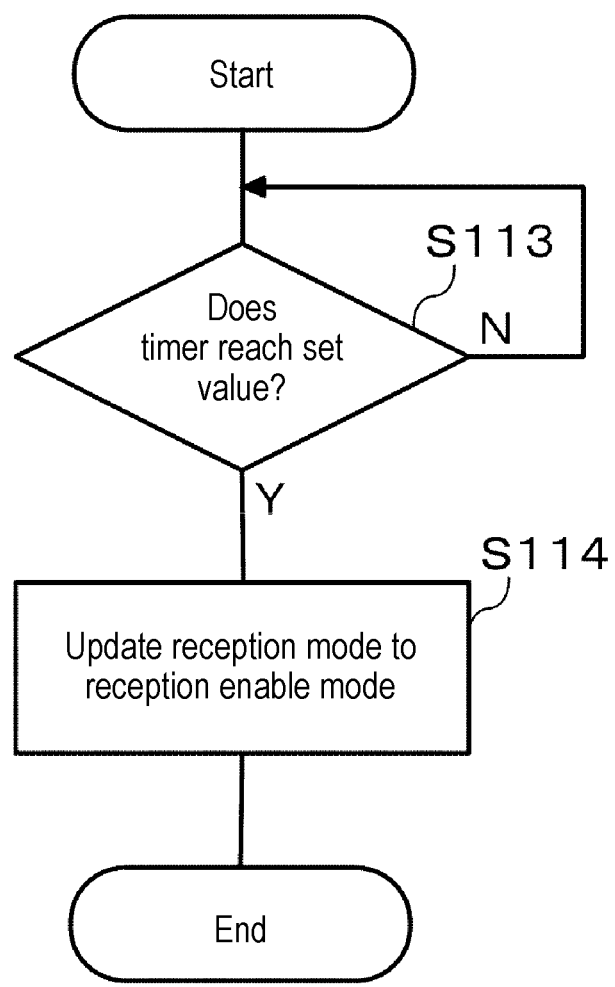
FIG. 4 is a flowchart for explaining update processing of a reception mode.

FIG. 4 is a flowchart for explaining update processing of a reception mode. When a count value of the timer reaches a set value (for example, 10 seconds) (Y in S113), determination unit 11 of HMI controller 10 updates the reception mode from the reception disable mode to the reception enable mode (S114). The count value of the timer may be changed according to the own vehicle peripheral situation. When a notification indicating completion of the control is received from automatic driving controller 20, or when it is determined that the control according to the control command is completed based on behavior of vehicle 1, determination unit 11 may update the reception mode from the reception disable mode to the reception enable mode.

Hereinafter, in this embodiment, as a control command, an example in which a control command for instructing a specific operation using a road guide sign is issued will be described. A user inputs a gesture operation for instructing a specific operation using a road guide sign to input unit 32. A specific example of the gesture operation will be described later.

Figure 5:
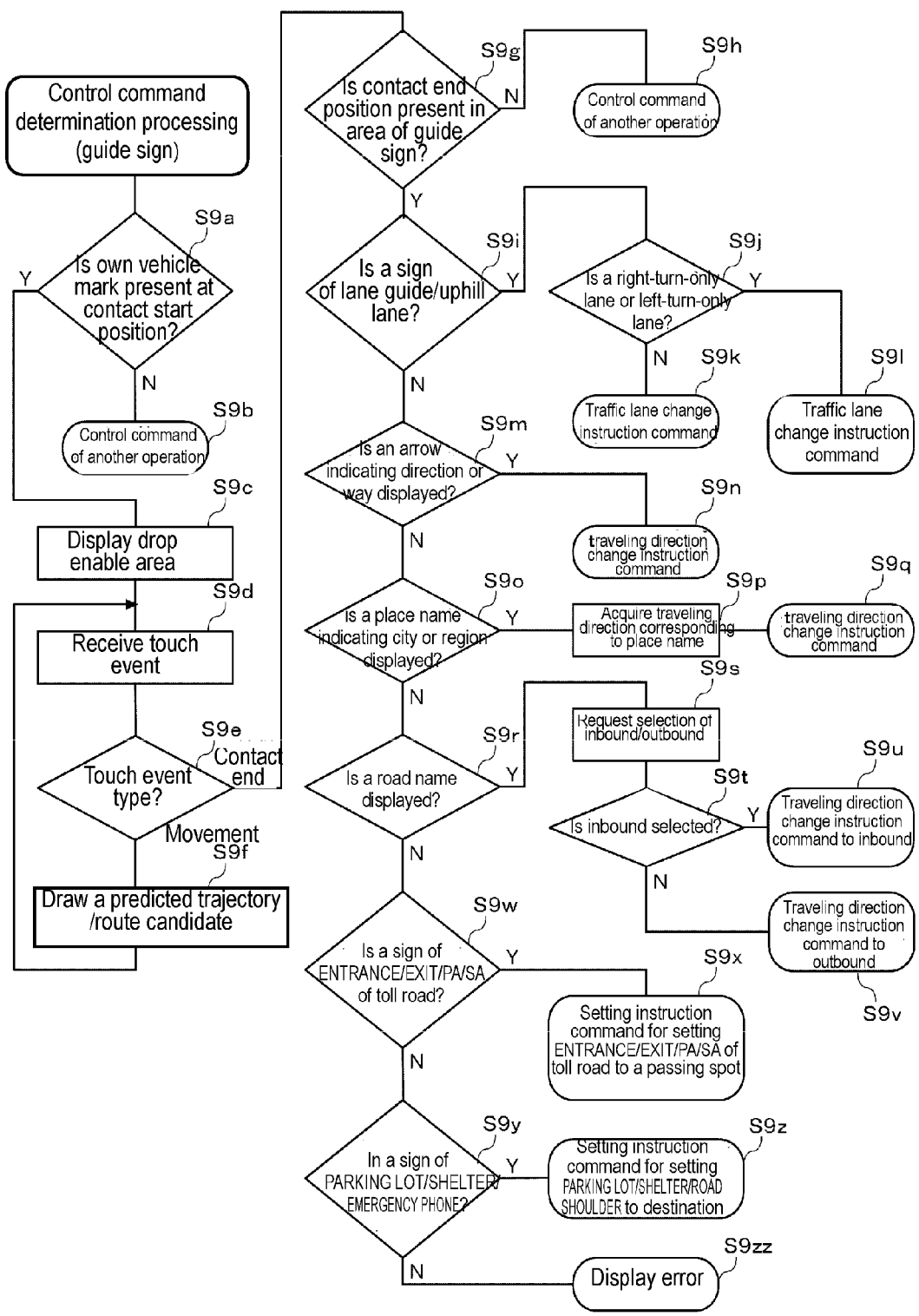
FIG. 5 is a flowchart illustrating an example of determination processing in a case where a gesture operation for instructing a specific operation using a road guide sign is input in step S9 of FIG. 3.

FIG. 5 is a flowchart illustrating an example of determination processing in a case where a gesture operation for instructing a specific operation using a road guide sign is input in step S9 of FIG. 3. Determination unit 11 of HMI controller 10 determines whether or not an own vehicle mark is present at a contact start position (S9a). In a case where the own vehicle mark is not present at the contact start position (N in S9a), determination unit 11 determines that the gesture operation is a control command of another operation in which a road guide sign is not used (S9b). In a case where the own vehicle mark is present at the contact start position (Y in S9a), generation unit 12 draws a drop enable area in the schematic diagram, and displays the area on display unit 31 (S9c). At this time, generation unit 12 generates a drop enable area of a road guide sign in the schematic diagram. Information on the drop enable area of the road guide sign is acquired from a local map information database that is prepared in advance or a map information database on a network. A coordinate of an object such as a place name, an arrow, or the like in the sign may be acquired by using image recognition technology based on a road guide sign image captured in a real time by a vehicle-mounted camera.

Determination unit 11 receives a touch event generated in input unit 32 (S9d), and determines the type of the touch event (S9e). In a case where the type of the touch event is a movement (movement in S9e), generation unit 12 draws a prediction trajectory/route candidate of vehicle 1 in the schematic diagram, and the prediction trajectory/route candidate of vehicle 1 is displayed on display unit 31 (S9f).

In a case where the type of the touch event is a contact end (contact end in S9e), determination unit 11 determines whether or not a contact end position is present in the area of the road guide sign (S9g). In a case where the contact end position is not present in the area of the road guide sign (N in S9g), determination unit 11 determines that the gesture operation is a control command of another operation in which the road guide sign is not used (S9h). In a case where the contact end position is present in the area of the road guide sign (Y in S9g), determination unit 11 determines whether or not the area of the road guide sign is an area of a lane guide sign or an uphill lane sign (S9i). In a case where the area of the road guide sign is an area of a lane guide sign or an uphill lane sign (Y in S9i), determination unit 11 determines whether or not the lane of a lane guide sign or an uphill lane sign is a right-turn-only lane or a left-turn-only lane (S9j). In a case where the lane is not a right-turn-only lane or a left-turn-only lane (N in S9j), determination unit 11 determines that the gesture operation is a traffic lane change instruction command for instructing the traffic lane change to the lane (S9k). In a case where the lane is a right-turn-only lane or a left-turn-only lane (Y in S9j), determination unit 11 determines that the gesture operation is a traffic lane change instruction command for instructing the traffic lane change to the lane, and a right turn instruction or a left turn instruction (S9l).

In step S9i, in a case where the dropped area is not an area of a lane guide sign or an uphill lane sign (N in S9i), determination unit 11 determines whether or not the dropped area is an area in which an arrow indicating a direction or a way is displayed (S9m). In a case where the dropped area is an area in which an arrow indicating a direction or a way is displayed (Y in S9m), determination unit 11 determines that the gesture operation is a traveling direction change instruction command for instructing the traveling direction change to the direction (S9n). In a case where the dropped area is not an area in which an arrow indicating a direction or a way is displayed (N in S9m), determination unit 11 determines whether or not the dropped area is an area in which a place name indicating a city or a region is displayed (S9o). In a case where the dropped area is an area in which a place name indicating a city or a region is displayed (Y in S9o), determination unit 11 acquires a traveling direction corresponding to the place name from the map information database (S9p). Determination unit 11 determines that the gesture operation is a traveling direction change instruction command for instructing the traveling direction change to the acquired traveling direction (S9q).

In step S9o, in a case where the dropped area is not an area in which a place name indicating a city or a region is displayed (N in S9o), determination unit 11 determines whether or not the dropped area is an area in which a road name is displayed (S9r). In a case where the dropped area is an area in which a road name is displayed (Y in S9r), generation unit 12 generates an image (for example, a menu or a dialog) or a voice that requests a selection of an inbound and an outbound, and notifies a user of the image or voice (S9s). In a case where an inbound is selected by a user (Y in S9t), determination unit 11 determines that the gesture operation is a traveling direction change instruction command for instructing the traveling direction change to the inbound (S9u). In a case where an outbound is selected by a user (N in S9t), determination unit 11 determines that the gesture operation is a traveling direction change instruction command for instructing the traveling direction change to the outbound (S9v).

In step S9r, in a case where the dropped area is not an area in which a road name is displayed (N in S9r), determination unit 11 determines whether or not the dropped area is an area in which a sign of an entrance, an exit, a parking area, or a service area of a toll road is displayed (S9w). In a case where the dropped area is an area in which a sign of an entrance, an exit, a parking area, or a service area of a toll road is displayed (Y in S9w), determination unit 11 determines that the gesture operation is a setting instruction command for setting the entrance, exit, parking area, or service area of the toll road to a passing spot (S9x).

In a case where the dropped area is not an area in which a sign of an entrance, an exit, a parking area, or a service area of a toll road is displayed (N in S9w), determination unit 11 determines whether or not the dropped area is an area in which a sign of a parking lot, a shelter, or an emergency phone is displayed (S9y). In a case where the dropped area is an area in which a sign of a parking lot, a shelter, or an emergency phone is displayed (Y in S9y), determination unit 11 determines that the gesture operation is a setting instruction command for setting the parking lot, shelter, or road shoulder at which an emergency phone is located to a destination (S9z). In step S9y, in a case where the dropped area is not a sign of a parking lot, a shelter, or an emergency phone (N in S9y), generation unit 12 displays an error message on display unit 31 (S9zz).

Hereinafter, a specific example of the gesture operation in which a road guide sign is used will be described. In the following examples, it is assumed that a touch panel display in which display unit 31 and input unit 32 are integrated is used.

FIG. 6 is a flowchart illustrating a processing example of issuing a command according to the content of the road guide sign by a gesture operation. Determination unit 11 of HMI controller 10 receives a touch event (DOWN) from the touch panel (S50). The touch event (DOWN) is an event representing a contact state change on the touch panel from a non-contact state to a contact state by a finger or a pen. Determination unit 11 determines whether or not a coordinate detected by the touch event (DOWN) is present in a display area of the own vehicle icon (S51). In a case where the coordinate detected by the touch event (DOWN) is present outside the display area of the own vehicle icon (N in S51), it is determined that the gesture operation is not an operation instruction corresponding to content of a road guide sign, and the process ends.

In a case where the coordinate detected by the touch event (DOWN) is present in the display area of the own vehicle icon (Y in S51), determination unit 11 receives a touch event (MOVE) from the touch panel (S52). The touch event (MOVE) is an event representing a change from a contact state on a certain point of the touch panel to a contact state on another point of the touch panel by a finger or a pen. Then, determination unit 11 receives a touch event (UP) from the touch panel (S53). The touch event (UP) is an event representing a contact state change on the touch panel from a contact state to a non-contact state by a finger or a pen.

Determination unit 11 determines whether or not a coordinate detected by the touch event (UP) is present in a display area of a road guide sign (S54). In a case where the coordinate detected by the touch event (UP) is present in the display area of the road guide sign (Y in S54), instruction unit 13 issues a command according to the content of the road guide sign to automatic driving controller 20 (S55). In a case where the coordinate detected by the touch event (UP) is present outside the display area of the road guide sign (N in S54), it is determined that the gesture operation is not an operation instruction corresponding to content of the road guide sign, and the process ends.

Figure 7A:
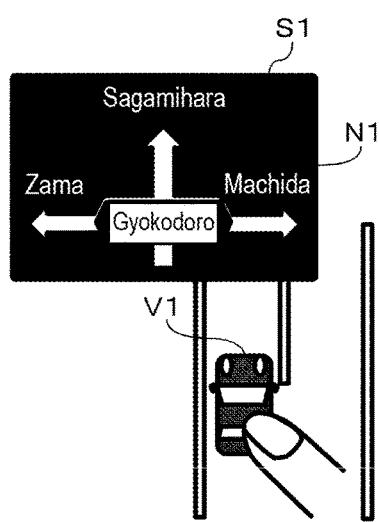
FIG. 7A and FIG. 7B are diagrams illustrating an example of issuing a course change instruction command or a route change instruction command using a destination guide sign at an intersection.
Figure 7B:
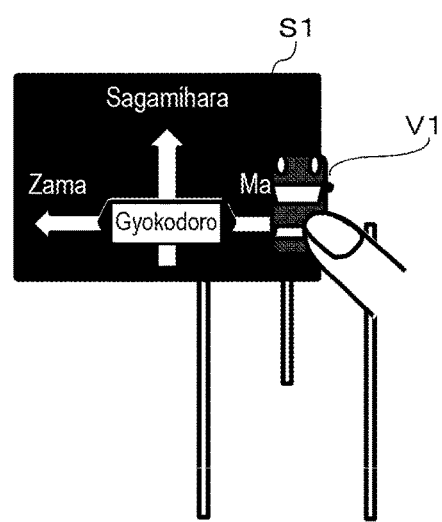

FIG. 7A and FIG. 7B are diagrams illustrating an example of issuing a course change instruction command or a route change instruction command using a destination guide sign at an intersection. In the schematic diagram illustrated in FIG. 7A, an own vehicle icon V1, a road, and a destination guide sign S1 are displayed. As display forms of the own vehicle, the road, and the guide sign, various display forms are considered. A real photographed image may be used, and a fine CG image or an animation image may be used. Display of the own vehicle is not limited to an icon, and the own vehicle may be displayed as a more simple mark or character, or may be displayed as a real photographed image. In other words, there is no problem as long as the own vehicle is displayed on a screen as an object in any display form.

In a case where a driver wants to change the course of the own vehicle to any one course displayed on a destination guide sign S1 at an intersection, as illustrated in FIG. 7A, a driver drags the own vehicle icon V1, and as illustrated in FIG. 7B, drops the own vehicle icon V1 onto a place name "Machida" N1 of a desired destination in the destination guide sign S1. Accordingly, a course change instruction command for changing the course of the own vehicle to a course of the desired destination is issued. Alternatively, a route change instruction command for changing the route of the own vehicle to a route in which the desired destination is set as a passing spot or a destination is issued.

Figure 8A:
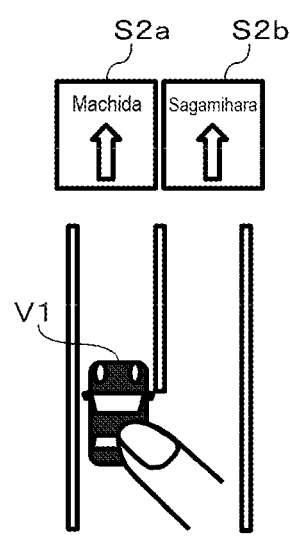
FIG. 8A and FIG. 8B are diagrams illustrating an example of issuing a course change instruction command or a route change instruction command using a traffic lane guide sign.
Figure 8B:
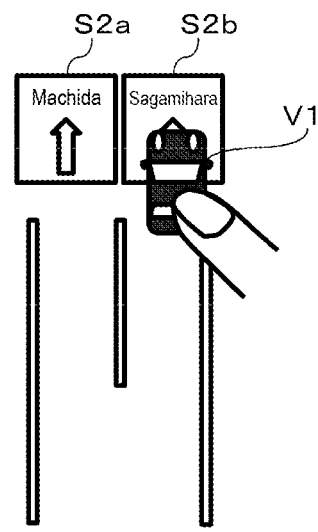

FIG. 8A and FIG. 8B are diagrams illustrating an example of issuing a course change instruction command or a route change instruction command using a traffic lane guide sign. In a case where a driver wants to change the course of the own vehicle to any one course displayed on traffic lane guide signs S2a and S2b, as illustrated in FIG. 8A, a driver drags the own vehicle icon V1, and as illustrated in FIG. 8B, drops the own vehicle icon V1 onto a desired traffic lane guide sign "Sagamihara" S2b. Accordingly, a course change instruction command for changing the course of the own vehicle to a course of the desired destination is issued. Alternatively, a route change instruction command for changing the route of the own vehicle to a route in which the desired destination is set as a passing spot or a destination is issued.

Figure 9A:
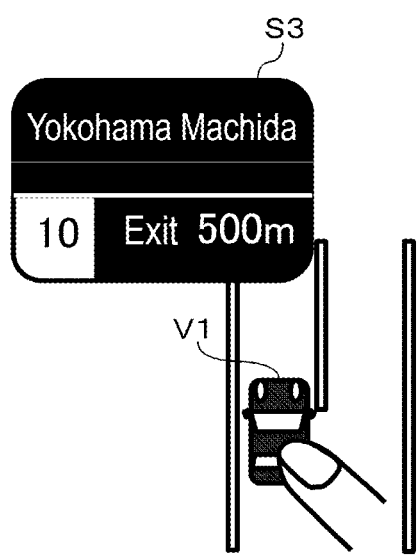
FIG. 9A and FIG. 9B are diagrams illustrating an example of issuing a setting instruction command for setting a passing spot using an exit guide sign of a toll road.
Figure 9B:
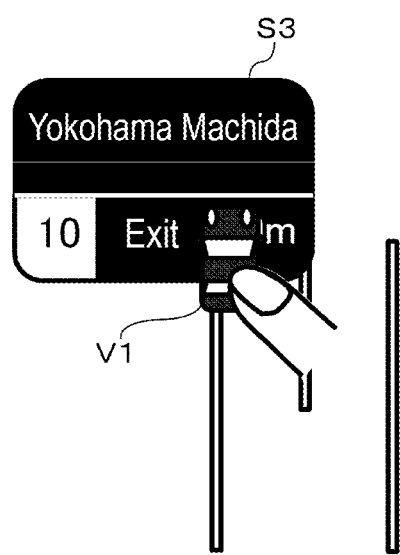

FIG. 9A and FIG. 9B are diagrams illustrating an example of issuing a setting instruction command for setting a passing spot using an exit guide sign of a toll road. In a case where a driver wants to exit a toll road through the next exit, as illustrated in FIG. 9A, a driver drags the own vehicle icon V1, and as illustrated in FIG. 9B, drops the own vehicle icon V1 onto an exit guide sign "Yokohama Machida" S3. Accordingly, a passing spot setting instruction command for setting the exit to a passing spot is issued. In a case where the route of the own vehicle is changed by the setting of a passing spot, a route change instruction command is issued.

Figure 10A:
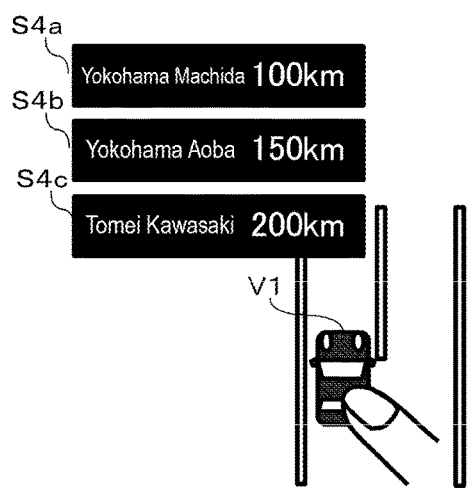
FIG. 10A and FIG. 10B are diagrams illustrating another example of issuing a setting instruction command for setting a passing spot using an exit guide sign of a toll road.
Figure 10B:
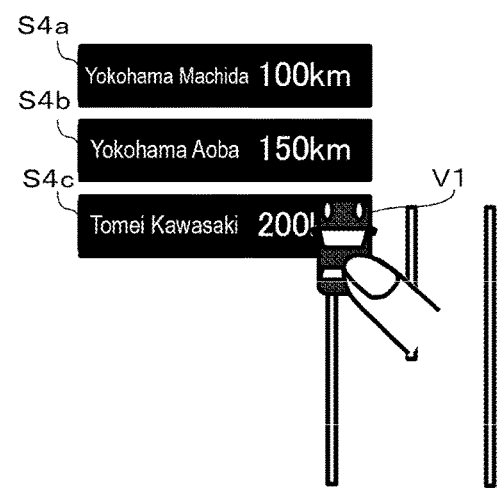

FIG. 10A and FIG. 10B are diagrams illustrating another example of issuing a setting instruction command for setting a passing spot using an exit guide sign of a toll road. In a case where a driver wants to exit a toll road through a desired exit, as illustrated in FIG. 10A, a driver drags the own vehicle icon V1, and as illustrated in FIG. 10B, drops the own vehicle icon V1 onto a desired exit guide sign "Tomei Kawasaki" S4c among multiple exit guide signs S4a, S4b, and S4c. Accordingly, a passing spot setting instruction command for setting the exit to a passing spot is issued. In a case where the route of the own vehicle is changed by the setting of a passing spot, a route change instruction command is issued.

Figure 11A:
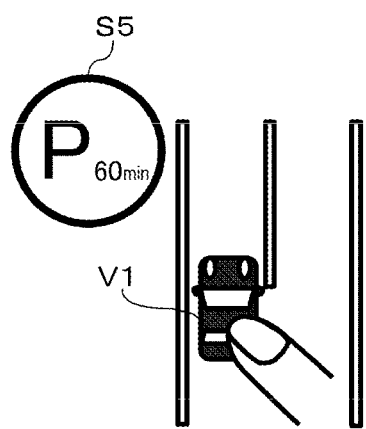
FIG. 11A and FIG. 11B are diagrams illustrating an example of issuing a destination setting instruction command for setting a destination using a parking lot guide sign.
Figure 11B:
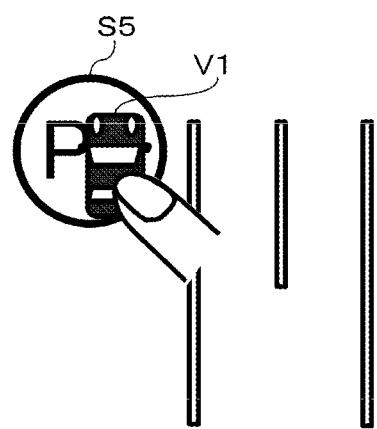

FIG. 11A and FIG. 11B are diagrams illustrating an example of issuing a destination setting instruction command for setting a destination using a parking lot guide sign. In a case where a driver wants to park the own vehicle in a parking lot, as illustrated in FIG. 11A, a driver drags the own vehicle icon V1, and as illustrated in FIG. 11B, drops the own vehicle icon V1 onto a parking lot guide sign S5. Accordingly, a destination setting instruction command for setting the parking lot to a destination is issued. When the destination is set, automatic driving controller 20 reroutes the original destination of the own vehicle to a new destination.

Figure 12A:
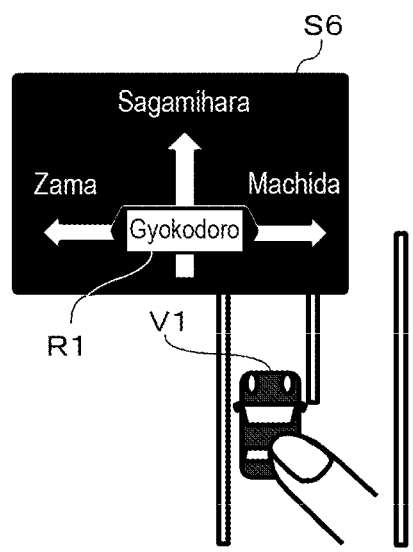
FIG. 12A to FIG. 12C are diagrams illustrating another example of issuing a course change instruction command using a destination guide sign at an intersection.
Figure 12B:
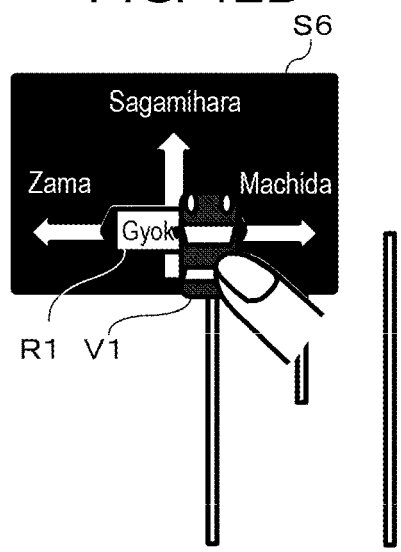
Figure 12C:
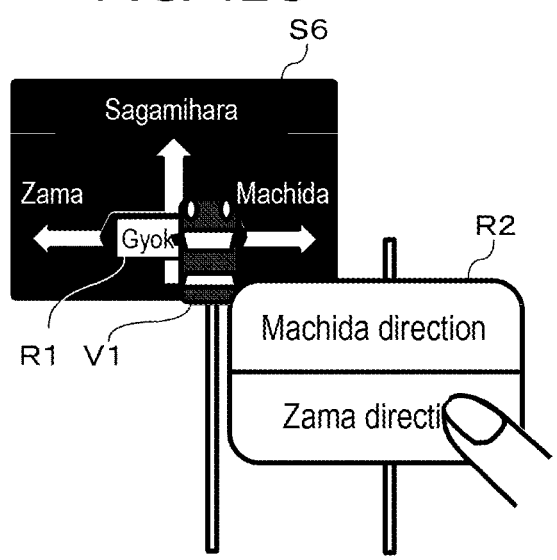

FIG. 12A to FIG. 12C are diagrams illustrating another example of issuing a course change instruction command using a destination guide sign at an intersection. In a case where a driver wants to change the course of the own vehicle to any one course displayed on a destination guide sign S6 at an intersection, as illustrated in FIG. 12A, a driver drags the own vehicle icon V1, and as illustrated in FIG. 12B, drops the own vehicle icon V1 onto a road name "Gyoko road" R1 on the destination guide sign S6. When the own vehicle icon V1 is dropped on the road name, as illustrated in FIG. 12C, a destination display window R2 of the inbound (Machida direction) and the outbound (Zama direction) of the road is displayed. The inbound or outbound of the destination display window R2 is touched by a driver. Accordingly, a course change instruction command for changing the course of the own vehicle to the course in the touched direction is issued.

Figure 13A:
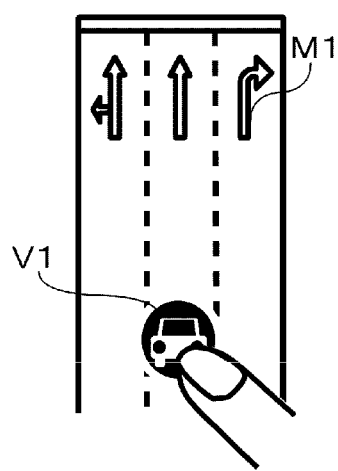
FIG. 13A and FIG. 13B are diagrams illustrating an example of issuing a traffic lane change instruction command and a course change instruction command using a guide sign on a traffic lane.
Figure 13B:
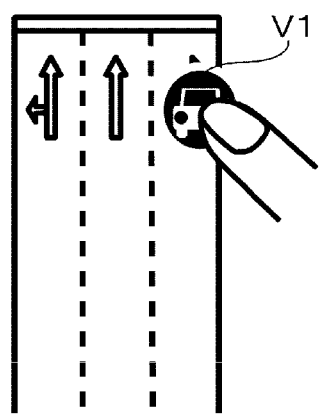

FIG. 13A and FIG. 13B are diagrams illustrating an example of issuing a traffic lane change instruction command and a course change instruction command using a guide sign on a traffic lane. In a case where a driver wants the own vehicle to turn right, as illustrated in FIG. 13A, a driver drags the own vehicle icon V1, and as illustrated in FIG. 13B, drops the own vehicle icon V1 onto a right-turn-only lane sign M1 on a traffic lane. Accordingly, a traffic lane change instruction command for instructing the traffic lane change to the right-turn-only lane and a right turn instruction command are issued.

In the above example, during a period for which the own vehicle icon is dragged and dropped, generation unit 12 may hold the original image (own vehicle icon before movement) in the schematic diagram, and delete the original image when the own vehicle icon is dropped. During the period for which the own vehicle icon is dragged and dropped, generation unit 12 may draw a trajectory of the drag of the own vehicle icon using a dotted line in the schematic diagram. During the period for which the own vehicle icon is dragged and dropped, generation unit 12 may invert the color of the road, and return the color of the road to the original color thereof when the own vehicle icon is dropped.

During the period for which the own vehicle icon is dragged and dropped, when there is a drop disable area (an opposite traffic lane or the like) or when an operation (traffic lane change or the like) is disabled, generation unit 12 may change (invert, thin, or the like) the color of the own vehicle icon. When the own vehicle icon is dropped, the own vehicle icon may return to the original position thereof, and an error message such as "operation disabled" may be displayed. Examples of a case where an operation is disabled includes approach of following vehicle, a traffic lane change prohibited area, exceeding of a limiting speed, or the like.

During the period for which the own vehicle icon is dragged and dropped, when an operation is disabled, generation unit 12 may change (invert, thin, or the like) a color of a background such as a road or the like. When an operation is enabled, the color of the background is returned to the original color thereof. During the period for which the own vehicle icon is dragged and dropped, generation unit 12 changes a color of the drop disable area. During the period for which the own vehicle icon is dragged and dropped, when there is a drop disable area or when an operation is disabled, generation unit 12 performs notification using an error sound or a vibration.

When the drag of the own vehicle icon is started, in a case where the start of an operation is disabled, generation unit 12 may change the color of the own vehicle icon. The drag operation (movement of the own vehicle icon) may be disabled. An error message such as "operation disabled" may be displayed. When the drag of the own vehicle icon is started, in a case where the start of an operation is disabled, generation unit 12 may change the color of the background such as a road or the like. When an operation is enabled, the color of the background is returned to the original color thereof. When the drag of the own vehicle icon is started, in a case where the start of an operation is disabled, generation unit 12 performs notification using an error sound or a vibration in a state where the drag operation (movement of the own vehicle icon) is disabled.

During the period for which the own vehicle icon is dropped and processing according to the control command is completed, generation unit 12 may display a state of the own vehicle as a ghost, and display a trajectory of the own vehicle. During the period for which the own vehicle icon is dropped and the own vehicle completes processing according to the control command, generation unit 12 may change a display state of the own vehicle icon (flashing, a color change, a size, a position, or the like). During the period for which the own vehicle icon is dropped and processing according to the control command is completed, determination unit 11 may queue a next instruction as an additional operation (reserve a control to be performed after the current control is completed).

As described above, according to the present embodiment, it is possible to transfer the content of various operations to automatic driving controller 20 by moving an icon displayed on the touch panel by a gesture operation. The gesture operation of the icon is a simple operation, and thus a driver is released from a driving operation in the related art such as turning of steering 51, depressing of accelerator pedal 53, or the like. For example, it is possible to easily instruct the operation according to the content of the road guide sign, by displaying a schematic diagram including a road guide sign and moving the own vehicle icon onto the road guide sign. A driver can perform a confirmation of a peripheral situation and an operation instruction on the touch panel at the same time, and thus the sight line of the driver does not move. Accordingly, it is possible to reduce the possibility of an erroneous operation and realize safer driving. In order to issue the control command, an operation for linking the own vehicle icon and the sign other than the operation may be used. Although a gesture operation corresponding to a control command is described as a drag-and-drop operation or the like, a touch-and touch operation may be used. A predetermined gesture operation is preferably used, but an operation that is customizable by a driver may be used. Further, in order to recognize the corresponding relationship of a gesture operation and a control command, a comment, an icon, or an arrow may be displayed by display unit 31, or a guide display or a voice guidance may be provided by display unit 31.

As above, the present invention has been described based on the embodiments. These embodiments have been presented by way of example only, and it should be understood by those skilled in the art that the embodiments can be modified in various forms by combining the respective elements or processing processes, and the modification examples are included in the scope of the present invention.

For example, although an example in which HMI controller 10 is implemented by a dedicated LSI is assumed, functions of HMI controller 10 may be realized using a CPU in a portable device such as a smart phone or a tablet that is used as display device 30. In this case, a portable device that is used as display device 30 and automatic driving controller 20 are directly connected to each other. Functions of HMI controller 10 may be realized by a CPU in a head unit such as a car navigation device, a display audio, or the like. A dedicated LSI on which HMI controller 10 is mounted may be included in a head unit.

In the above-mentioned embodiment, an example in which a command according to the display content in a sign is issued by dragging and dropping the own vehicle icon onto a sign object indicating a road guide sign is described. In this regard, similarly, a command according to the display content in a sign can be also issued by dragging and dropping the sign object onto the own vehicle icon.

The embodiments may be specified by the following items.

[Item 1]

A driving support device (10) including;

an image output unit (14a) that outputs an image including an own vehicle object representing an own vehicle and a sign object representing a sign, to a display unit (31);

an operation signal input unit (14b) that receives an operation signal of a user for moving, in the image displayed on the display unit (31), the own vehicle object to the position of the sign object or for moving the sign object to the position of the own vehicle object; and a command output unit (14c) that outputs a command according to the display content in the sign object when the operation signal is received, to an automatic driving control unit (20) that controls automatic driving.

Here, "sign" is a sign on road traffic, and may be a guide sign or a traffic sign.

In this case, a user can intuitively and conveniently perform an operation according to the content of the sign.

[Item 2]

The driving support device (10) according to Item 1, in which the command output unit (14c) outputs a command for setting, as a destination or a passing spot, a place specified by the display content in the sign object to which the own vehicle object is moved, to the automatic driving control unit (20).

In this case, a user can intuitively and conveniently perform an operation for setting a destination or a passing spot.

[Item 3]

The driving support device (10) according to Item 1 or 2, in which the command output unit (14c) outputs a command for instructing the own vehicle to enter a traffic lane in the sign object to which the own vehicle object is moved, to the automatic driving control unit (20).

Here, "enter" includes right turn, left turn, U-turn, and traffic lane change.

In this case, a user can intuitively and conveniently perform an operation for instructing right turn, left turn, U-turn, and traffic lane change.

[Item 4]

The driving support device (10) according to Item 3, in which when the operation signal input unit (14b) receives an operation signal of the user for moving the own vehicle object in the image displayed on the display unit (31) to a traffic lane or a road name in the sign object, the image output unit (14a) outputs an image including a selection object for selecting an inbound or an outbound of the traffic lane, to the display unit (31).

In this case, a user can intuitively and conveniently instruct the own vehicle to travel in an inbound or an outbound when changing the course of the own vehicle to another road.

[Item 5]

A driving support system (10, 30) including:
a display device (30) that displays an image; and
a driving support device (10) that outputs an image to the display device (30),
in which the driving support device (10) includes:
an image output unit (14a) that outputs an image including an own vehicle object representing an own vehicle and a sign object representing a sign, to the display device (30);
an operation signal input unit (14b) that receives an operation of a user for moving, in the image displayed on the display device (30), the own vehicle object to the position of the sign object or for moving the sign object to the position of the own vehicle object; and
a command output unit (14c) that outputs a command according to the display content in the sign object when the operation is received, to an automatic driving control unit (20) that controls automatic driving.

In this case, a user can intuitively and conveniently perform an operation according to the content of the sign.

[Item 6]

A driving support method including;
a step of outputting an image including an own vehicle object representing an own vehicle and a sign object representing a road sign, to a display unit (31);
a step of receiving an operation of a user for moving, in the image displayed on the display unit (31), the own vehicle object to the position of the sign object or for moving the sign object to the position of the own vehicle object; and
a step of outputting a command according to the display content in the sign object when the operation is received, to an automatic driving control unit (20) that controls automatic driving.

In this case, a user can intuitively and conveniently perform an operation according to the content of the sign.

[Item 7]

A driving support program and a recording medium in which the driving support program is recorded, the driving support program causing a computer to execute;
processing of outputting an image including an own vehicle object representing an own vehicle and a sign object representing a sign, to a display unit (31);
processing of receiving an operation of a user for moving, t in the image displayed on the display unit (31), the own vehicle object to the position of the sign object or for moving the sign object to the position of the own vehicle object; and
processing of outputting a command according to the display content in the sign object when the operation is received, to an automatic driving control unit (20) that controls automatic driving.

In this case, a user can intuitively and conveniently perform an operation according to the content of the sign.

[Item 8]

An automatic drive vehicle (1) including:
an image output unit (14a) that outputs an image including an own vehicle object representing an own vehicle and a sign object representing a sign, to a display unit (31);
an operation signal input unit (14b) that receives an operation signal of a user for moving, in the image displayed on the display unit (31), the own vehicle object to the position of the sign object or for moving the sign object to the position of the own vehicle object;
a command output unit (14c) that outputs a command according to the display content in the sign object when the operation is received; and
an automatic driving control unit (20) that executes the output command.

In this case, a user can intuitively and conveniently perform an operation according to the content of the sign.

The present invention can be used in a vehicle equipped with automatic driving mode.

The invention claimed is:

1. A driving support device comprising:
an image output unit, which, in operation, outputs image information for an image to a display unit, the image including a vehicle icon representing a vehicle and a sign icon representing a place;
an operation signal input unit, which, in operation, receives an operation signal of a user:
  dragging, in the image, the vehicle icon to a position of the sign icon, or
  dragging, in the image, the sign icon to a position of the vehicle icon; and
a command output unit, which, in operation, outputs, in response to the operation signal being received by the operation signal input unit, an automatic driving control command to an automatic driving control unit configured to control automatic driving of the vehicle, the automatic driving control command setting a course of the vehicle to the place.

2. The driving support device of claim 1, wherein the place is a traffic lane, and the automatic driving control command instructs the vehicle to enter the traffic lane.

3. The driving support device of claim 1, wherein when the operation signal input unit receives an operation signal of the user dragging, in the image, the vehicle icon to a road name of a road in the sign icon, the image output unit outputs image information to the display unit to include a selection icon for selecting an inbound or an outbound direction of the road.

4. The driving support device of claim 1, wherein the place is a destination, and the automatic driving control command set a course of the vehicle to the destination.

5. A driving support system comprising:
a display device, which, in operation, displays an image; and
a driving support device, which, in operation, outputs image information for the image to the display device,
wherein the driving support device includes:
   an image output unit, which, in operation, outputs image information including a vehicle icon representing a vehicle and a sign icon representing a place, to the display device;
   an operation signal input unit which, in operation, receives an operation signal of a user:
      dragging, in the image, the vehicle icon to a position of the sign icon, or
      dragging, in the image, the sign icon to a position of the vehicle icon; and
   a command output unit, which, in operation, outputs, in response to the operation signal being received by the operation signal input unit, an automatic driving control command to an automatic driving control unit configured to control automatic driving of the vehicle, the automatic driving control command setting a course of the vehicle to the place.

6. The driving support system of claim 5, wherein the automatic driving control command sets the place as a destination or a passing spot.

7. The driving support system of claim 5, wherein the place is a traffic lane, and the automatic driving control command instructs the vehicle to enter the traffic lane.

8. The driving support system of claim 5, wherein when the operation signal input unit receives an operation signal of the user dragging, in the image, the vehicle icon to a road name of a road in the sign icon, the image output unit outputs image information including a selection icon for selecting an inbound or an outbound direction of the road.

9. A driving support method comprising;
outputting image including a vehicle icon representing a vehicle and a sign icon representing a place;
receiving an operation signal of a user:
   dragging, in the image, the vehicle icon to a position of the sign icon, or
   dragging, in the image, the sign icon to a position of the vehicle icon; and
outputting, in response to receiving the operation signal, an automatic driving control command to an automatic driving control unit that controls automatic driving of the vehicle, the automatic driving control command setting a course of the vehicle to the place.

10. The driving support method of claim 9, wherein the automatic driving control command sets the place as a destination or a passing spot.

11. The driving support method of claim 9, wherein the place is a traffic lane, and the automatic driving control command instructs the vehicle to enter the traffic lane.

12. The driving support method of claim 9, further comprising:
receiving an operation signal of the user dragging, in the image, the vehicle icon to a road name of a road in the sign icon; and
outputting a selection icon in the image for selecting an inbound or an outbound direction of the road.

* * * * *